United States Patent [19]
Heller, Sr.

[11] Patent Number: 5,798,493
[45] Date of Patent: Aug. 25, 1998

[54] FIXED WELDING APPARATUS AND METHOD

[76] Inventor: Walter R. Heller, Sr., 129 Founders Point South, Bloomingdale, Ill. 60108

[21] Appl. No.: 645,902

[22] Filed: May 14, 1996

[51] Int. Cl.$^6$ .................................................. B23K 9/167
[52] U.S. Cl. ........................................ 219/75; 219/124.02
[58] Field of Search ................................ 219/75, 124.01, 219/124.03, 124.1, 124.33, 125.1, 125.11, 136, 60 R, 61

[56] References Cited

U.S. PATENT DOCUMENTS

| | | |
|---|---|---|
| 2,106,692 | 1/1938 | Embelton . |
| 2,299,679 | 10/1942 | Casner . |
| 2,393,199 | 1/1946 | Somerville . |
| 2,794,898 | 6/1957 | Gibson ........................ 219/75 |
| 3,007,032 | 10/1961 | Whiteman . |
| 3,030,489 | 4/1962 | Schaefer et al. ........................ 219/75 |
| 3,309,492 | 3/1967 | Fields ........................ 219/75 |
| 3,349,213 | 10/1967 | Gorman . |
| 3,544,752 | 12/1970 | Lehnert et al. . |
| 3,673,374 | 6/1972 | Hauck . |
| 3,757,079 | 9/1973 | Blomgren, Sr. et al. . |
| 3,770,935 | 11/1973 | Tateno et al. . |
| 3,931,489 | 1/1976 | Roderburg et al. ........................ 219/125.1 |
| 3,950,629 | 4/1976 | Auzary et al. . |
| 4,119,828 | 10/1978 | Bykhovsky et al. . |
| 4,136,273 | 1/1979 | Eujita et al. . |
| 4,251,708 | 2/1981 | Corcelle et al. . |
| 4,280,042 | 7/1981 | Berger et al. . |
| 4,300,034 | 11/1981 | Schneider et al. . |
| 4,341,944 | 7/1982 | Breen . |
| 4,367,393 | 1/1983 | Yerushalmy et al. . |
| 4,442,340 | 4/1984 | Kawabata et al. . |
| 4,506,821 | 3/1985 | Bernou et al. . |
| 4,543,461 | 9/1985 | Hill . |
| 4,553,014 | 11/1985 | Culbreth . |
| 4,748,312 | 5/1988 | Hatch et al. . |
| 4,760,994 | 8/1988 | Ferguson . |
| 4,780,591 | 10/1988 | Bernecki et al. . |
| 5,258,599 | 11/1993 | Moerke . |
| 5,278,387 | 1/1994 | Borne . |
| 5,298,713 | 3/1994 | Marlin . |
| 5,536,912 | 7/1996 | Staschewski ........................ 219/75 |

FOREIGN PATENT DOCUMENTS

| | | |
|---|---|---|
| 0077 705 | 4/1985 | European Pat. Off. . |
| 0 109 891 B1 | 1/1987 | European Pat. Off. . |
| 255102 A1 | 3/1988 | Germany . |
| 53-95153 | 8/1978 | Japan . |

OTHER PUBLICATIONS

English abstract of German patent document No. DD243453, Mar. 1987.

*Primary Examiner*—Clifford C. Shaw
*Attorney, Agent, or Firm*—Brinks Hofer Gilson & Lione

[57] ABSTRACT

Fixed welding apparatus includes a torch body, a pusher rod, a reverse collet, and a collet. The pusher rod is slidably received within an opening formed through the torch body. A portion of the reverse collet is positioned in an opening formed in the pusher rod. The collet is attached to the torch body and contacts with the reverse collet. The torch body also may include at least one notch formed in its side to receive a retractable arm member, which slidably fits in the notch. The fixed welding apparatus may also include a torch housing, an adjusting knob and shaft, a beveled gear set attached to the shaft, an adjusting screw attached to the gear set, and an indicator block which attaches to the retractable arm.

14 Claims, 3 Drawing Sheets

FIXED WELDING APPARATUS AND METHOD

TECHNICAL FIELD

The invention relates to a fixed welding system. In particular, this invention relates to an improved design for and method of operating a fixed single, double or multi-torch arc welder used in various welding operations including welding rolled formed ferrous and nonferrous metal product.

BACKGROUND OF THE INVENTION

Fixed welding systems are used in a variety of welding processes. These processes include, for example, TIG (tungsten, inert gas process), MIG (metallic, inert gas process), and PAW (plasma-arc welding).

In each type of arc welding process, the welding torch is fixed in a position relative to the work, for example, metal piping, that is to be welded. The primary function of the torch is to position the electrode relative to the work to be welded and to connect the electrode to a source of electrical current. In the case of TIG, MIG and PAW processes, another function of the torch is to form an inert gas shield about the welding arc.

One problem with existing torches is their inability to adjust to varying sizes of work. In welding rolled formed product, for example, which includes metal piping and tube of various dimensions, it would be desirable to have a fixed single, double or multi-head torch which could be easily positioned and adjusted to weld any diameter product.

Another problem with existing fixed welding systems is that specially manufactured collet assemblies are used which are both expensive and difficult to efficiently replace. Moreover, existing fixed welding systems use spring-loaded locking connections between the torch body and collet assembly. When the spring is heated it does not maintain a positive contact between the torch body and electrode which is held by the collet. It would be desirable to have a fixed welding system which utilizes an inexpensive collet assembly that would provide a continuous positive contact between the torch body and electrode.

Another problem with existing multi-torch fixed welding systems is the transfer of heat between the torches which can effect the torch operation. It would be desirable to reduce this heat transfer with a more effective insulating material.

SUMMARY OF THE INVENTION

The invention provides fixed welding apparatus including a torch body, a pusher rod, a reverse collet, and collet. The torch body includes an opening formed through its length. The pusher rod slidably fits into the torch body opening. The pusher rod includes an opening formed therethrough. The reverse collet includes a portion positioned in the pusher rod opening. The collet is attached to the torch body and contacts the reverse collet. The apparatus further provides for the reverse collet to be clamped onto an electrode. In addition, a heat shield may be attached to the collet, and a cup may be attached to the heat shield. The apparatus includes other additional features including the following. The pusher rod may have a threaded portion for screwably attaching to the torch body. The collet may also have a threaded portion for screwably attaching the torch body. The pusher rod opening may also include a tapered sidewall portion for receiving a tapered portion of the reverse collet, which clamps the reverse collet onto the electrode. The pusher rod may have a knurled end for allowing a user to easily screw the pusher rod to the torch body. The pusher rod may also have a groove formed therein for receiving an O-ring, which seals the torch opening preventing any shield gas which travels through the opening in the pusher rod from escaping.

The invention also provides for fixed welding apparatus including a torch body slidably fitted in a torch housing. The torch body includes at least one opening formed in a side portion of its body. A retractable arm member slidably fits in the side opening. The retractable arm member is preferably spring-loaded, and may preferably include an indicator pin attached to the arm member. The pin may include a cap at its outer end to allow a user to pull outward on the pin to retract the arm from the side opening. The opening may comprises two notches formed to slidably receive the arm.

The invention further provides for fixed welding apparatus including a torch housing, an adjusting knob extending outward from the torch housing, an adjusting shaft connected to the adjusting knob, a beveled gear set in communication with the adjusting shaft, an adjusting screw in communication with the beveled gear set, an indicator block having formed therein a threaded opening for receiving the adjusting screw, an indicator arm connected to the indicator block; and a torch body connected to the indicator arm. The indicator block may have a second opening formed therein perpendicular to the threaded opening for slidably receiving the indicator arm. The torch body may have a notch formed therein for receiving an inner portion of the indicator arm. The apparatus further includes an indicator pin extending from the torch housing and connected to the indicator arm. The indicator pin slidably fits in an opening formed in the indicator arm for moving an inner portion of the arm into a notch formed in the torch body. The apparatus may further include a second notch formed in the torch body and positioned below the first notch. The apparatus may further include an insulator plate positioned adjacent the torch body at its sides and/or its bottom end. The insulator plates may be made of bakelight insulation.

The invention further provides a fixed multi-torch welding system which includes a plurality of spaced torch bodies each including a vertically oriented opening formed therethrough, a plurality of pusher rods slidably fitting through the torch body openings and screwably attached to the torch bodies, a plurality of reverse collets press fitted into the bottom of the pusher rods, and a plurality of collets receiving a bottom portion of the reverse collets and screwably attached to the torch bodies. The system further provides for a plurality of bakelight insulator plates positioned adjacent the torch bodies.

The invention further provides for a method of operating a fixed welding system. A torch body including an opening formed therethrough is provided. A pusher rod is inserted into the torch body opening to press fit a portion of a reverse collet into an opening in the pusher rod which clamps the reverse collet to an electrode. The method further includes screwing the pusher to the torch body. The method further includes attaching a collet to the torch body. The method further includes contacting the reverse collet to the collet.

The invention further provides for a method of adjusting a fixed welding system. A torch body including a side opening formed therein is provided. An arm is received in the side opening and the arm is slidably attached to an adjusting block having a vertically oriented adjusting screw therein. An adjustment knob attached to a horizontally oriented adjusting shaft is rotated. The rotation is transferred through a beveled gear set to the adjusting screw.

The invention further provides a method of positioning a fixed welding system. A torch body including a notch formed therein for receiving an arm member is provided. A compression biased pin member attached to the arm member is pulled. The notch is aligned with the arm member. The pin member is released thereby moving the arm member into the notch. The torch body may include an additional notch or notches formed in its side and positioned below the first notch for receiving the arm member.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
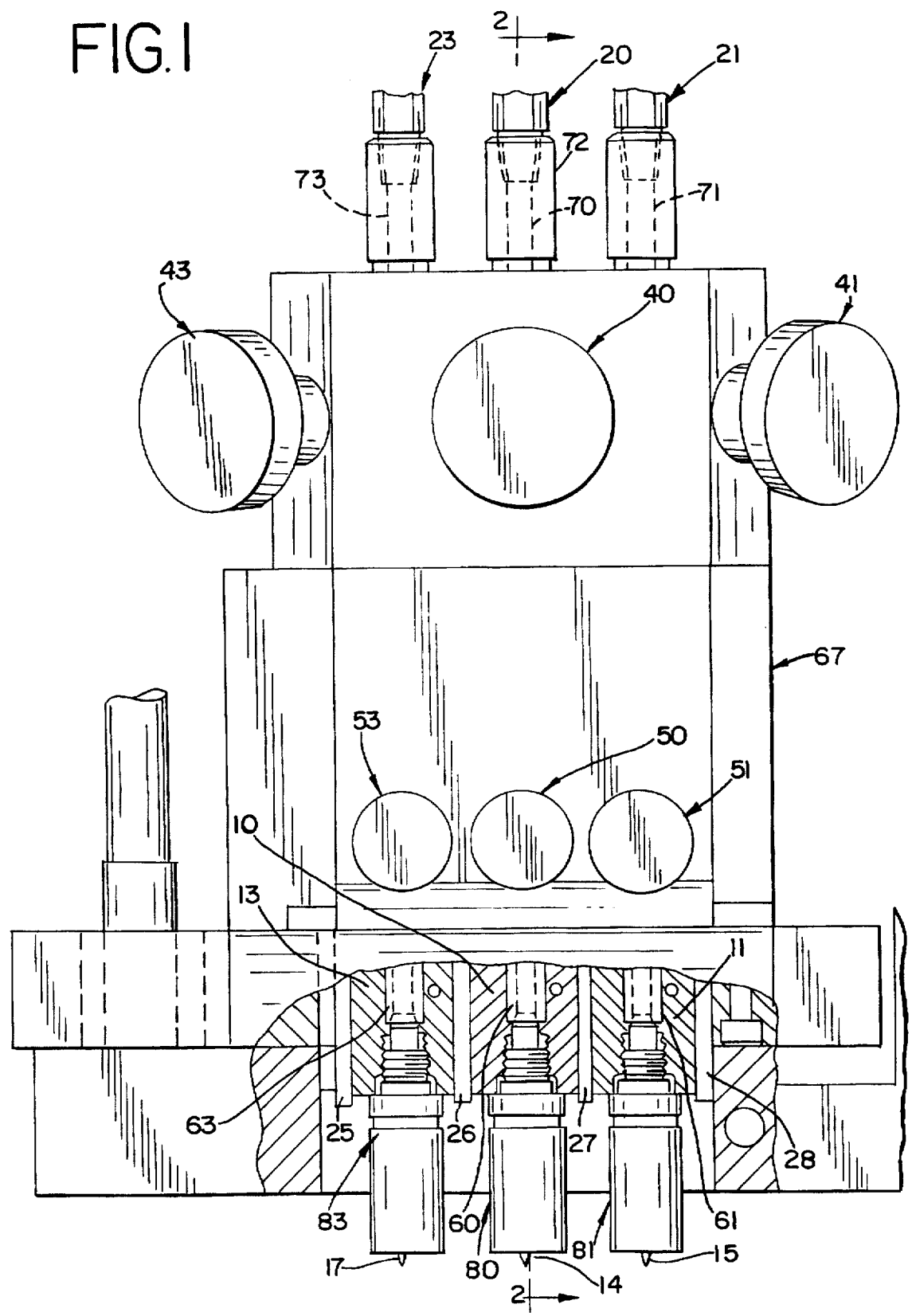
FIG. 1 is a front view of a three-torch embodiment of the invention shown in partial section.

Referring to FIG. 1, a three torch embodiment of the fixed welding system is shown. Enclosed in the torch housing 67 are three torches, which include torch bodies 10, 11, 13. Torch bodies 10, 11, 13 are preferable made of copper, and act as heat sinks. Each of the torch bodies 10, 11, 13 are separated from each other and torch housing 67 by insulation plates 25–28. Preferably, plates 25–28 are made from bakelight insulation. Adjusting knobs 40, 41, 43 extend from torch housing 67, and control the positioning of the individual torch bodies 10, 11, 13 from the work. Knobs 40, 41, 43 are positioned to allow the operator easy access. Indicator pins 50, 51, 53 may be pulled outward to allow removal of torch bodies 10, 11, 13. Inert gas is fed through inlets 20, 21, 23. Various gas flow control panels (not shown) may be used with this fixed welding system. The inert gas, for example, argon or nitrogen, is used as shielding gas during operation of the welder. The inert gas passes through pusher rod pathways or openings (shown in phantom) 70, 71, 73 formed in pusher rods 60, 61, 63 and through collet and cup assemblies 80, 81, 83. Electrodes 14, 15, 17 are shown extending from collet and cup assemblies 80, 81, 83.

Figure 2:
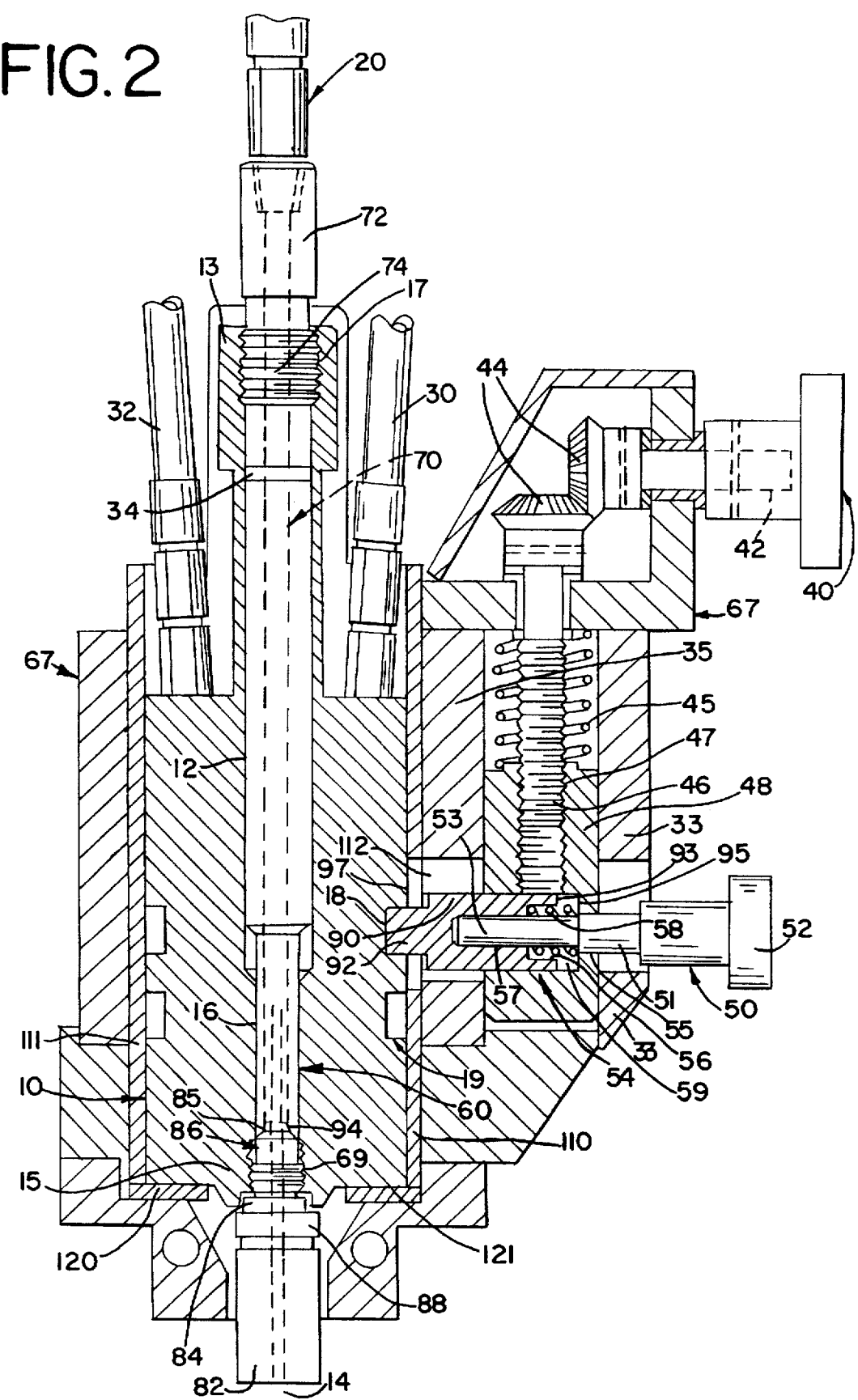
FIG. 2 is a sectional view taken through line 2—2 of FIG. 1.

Referring to FIG. 2, a sectional view of the center torch body 10 and torch housing 67 of FIG. 1 is shown. Electrode 14 (partially in phantom) extends through collet and cup assembly 80 into opening 70 formed through pusher rod 60. Adjusting knob 40 is attached to an adjusting shaft 42 (shown partially in phantom). Adjusting shaft 42 is connected to a beveled gear set 44, which is connected to an adjusting screw 46. Adjusting screw 46 is received in a threaded opening 47 formed in an indicator block 48, which abuts with a compression spring 45. Indicator block 48 slides between an indicator plate 33 and front plate 35. Indicator block 48 has a first opening 55 perpendicular to threaded opening 47 for receiving indicator pin 50, and a second opening 56 for receiving indicator arm 54. The indicator arm 54 is also preferably made from steel and includes an outer portion 90, and extended inner portion 92. Inner portion 92 slidably fits in either of notches 18, 19 which are formed in torch body 10. In FIG. 2, inner portion 92 is shown engaged in upper notch 18. The outer portion 90 of indicator arm 54 has a first opening 56 formed at its outer end for receiving spring 58, and a second opening 57 in communication with first opening 56 for receiving an indicator pin 50. Indicator pin 50 is preferably made of steel or other rigid material, and includes cap 52, outer pin portion 51 and inner pin portion 53. Outer and inner pin portions 51, 53 are preferably cylindrical, with outer pin 51 having a diameter greater than inner pin portion 53. Inner pin portion 53 extends through spring 58 and into indicator opening 57.

Referring to FIG. 2, the torch body 10 is cooled with water which enters through inlet hose 32 and is fed through a passage (not shown) in torch body 10. The water exits the torch body 10 through outlet hose 30. Also fed in through inlet 32 is a power cable (not shown), which provides power to the torch body 10. A positive contact is formed between electrode 14 and torch body 10 through reverse collet 86, which holds electrode 14 and is in contact with torch body 10 through its contact with collet 84. For additional protection against the extreme heat generated during operation side insulator plates 110, 111 and bottom insulator plates 120, 121 are positioned along the perimeter of the torch body 10. Insulator plates 110, 111, 120, 121 are preferably made of bakelight insulation.

Figure 3:
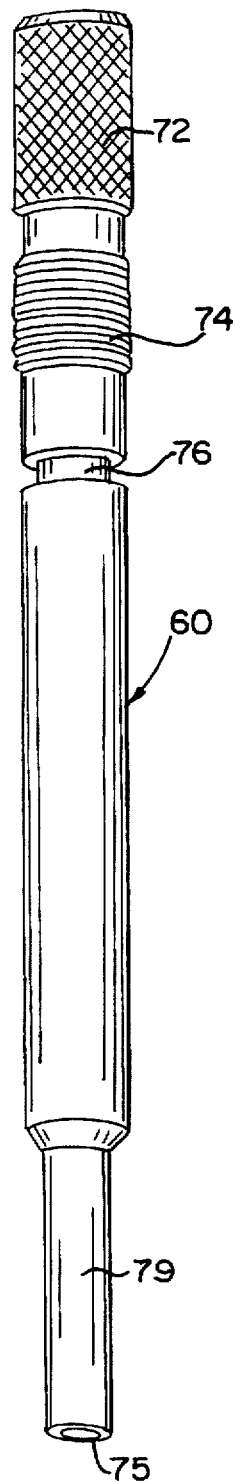
FIG. 3 is a side elevational view of a preferred embodiment of a pusher rod.
Figure 4:
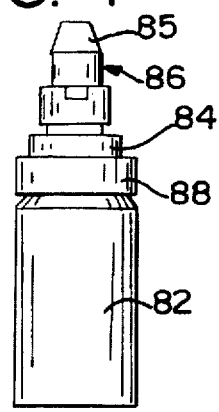
FIG. 4 is a side elevational view of a preferred collet assembly shown assembled.
Figure 5:
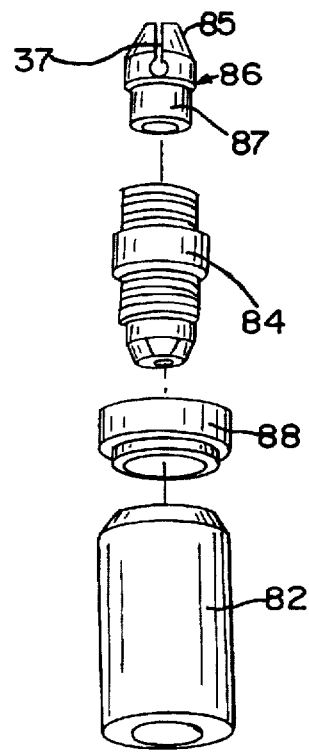
FIG. 5 is an exploded view of the collet assembly of FIG. 4.

Referring to FIGS. 2 and 3, pusher rod 60 is received in an opening or passage 12 formed through torch body 10. A knurled knob 72 allows an operator to easily screw the threaded portion 74 of pusher rod 60 into a threaded region 17 formed in an upper portion 13 of torch body 10. A reverse collet 86 is received in an outlet opening 75 of the pusher rod 60. Outlet opening 75 has a tapered inner wall 94 that contacts upper tapered portion 85 of reverse collet 86 thereby closing the split opening 37 in reverse collet 86, and tightly clamping it against the electrode 14. As shown in FIGS. 4 and 5, a bottom portion 87 of reverse collet 86 is received within an opening in a collet 84, which is screwed into a threaded opening 69 formed in a bottom portion 15 of torch body 10. A heat shield 88, which is screwed to a threaded portion of collet 84, acts to separate and protect collet 84 and reverse collet 86 from the extreme heat which is transferred to cup 82. The cup 82 is screwed to the bottom portion of heat shield 88. Referring to FIGS. 2 and 3, pusher rod 60 has a groove 76 formed beneath threaded portion 74 for receiving an O-ring 34. The O-ring 34 seals opening 12 and prevents any inert gas from escaping. Opening 12, has a narrowed bottom portion 16 designed to receive the narrowed portion 79 of pusher rod 60.

Figure 6:
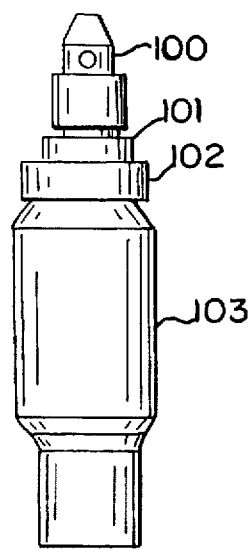
FIG. 6 is a side elevational view of an alternative preferred collet assembly shown assembled.
Figure 7:
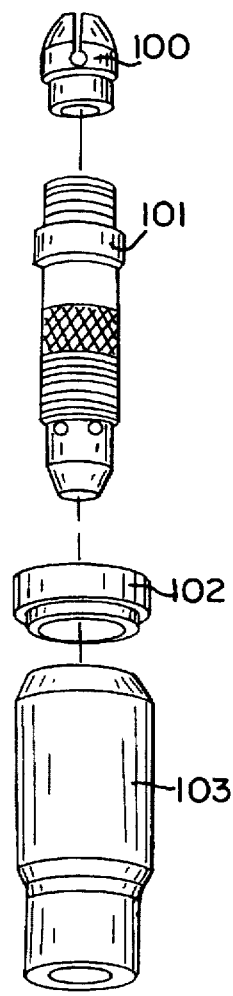
FIG. 7 is an exploded view of the collet and cup assembly of FIG. 6.

Referring to FIGS. 4 and 5, a short cup and collet assembly is shown including reverse collet 86, collet 84, heat shield 88, and cup 82. Alternatively, for example, a long cup and collet assembly, as shown in FIGS. 6 and 7, including reverse collet 100, collet 101, heat shield 102, and cup 103. The long cup assembly may preferably be used when welding smaller diameter tubing because it extends deeper into the weld box. The assemblies of FIGS. 4–7 can be conveniently purchased off the shelf and are supplied, for example, by CK Systematics, Inc., and other welding material suppliers. The parts were designed for use with hand held welders. Collets 84, 101 and reverse collets 86, 100 are preferably made of brass or copper. Heat shields 88, 102 are preferably made from a heat resistant material, and cups 82, 103 are preferably made of ceramic or alumina. The cup and collet assemblies are available in various sizes, many of which are interchangeable.

In operating the fixed welding system, the operator first determines the appropriate cup and collet assembly. The operator also determines the appropriate torch positioning by choosing one of notches 18, 19 for arm placement. This decision depends on, for example, the type and diameter of the tubing to be welded. Variations, of pin placement and cup and collet assemblies can be used to achieve the optimum set up. For a very small diameter tube, the operator may choose, for example, high notch 18 pin placement and long cup and collet assembly 100–103. For a large diameter tube, the operator may choose, for example low notch 19 pin placement, and short cup and collet assembly 82, 84, 86, 88.

After selecting, for example, the short cup and collet assembly with low notch 19 for arm placement, the operator screws the collet 84 with attached heat shield 88 and cup 82 into the threaded portion 69 of the torch body 10. Next, reverse collet 86 is placed onto the electrode 14 through the opening formed in reverse collet 86. Reverse collet 86 is press fitted into the bottom 75 of pusher rod 12. The tapered upper portion 85 is tightly fitted with the tapered portion 94 of pusher rod 12. Electrode 14 extends into passageway or cylindrical opening 70. The sharpened portion of the electrode 14 extends from the reverse collet 86 a desired distance. Using knurled knob 72 the operator may then screw the threaded portion 74 of pusher rod 12 into the threaded region 17 formed in upper portion 13 of torch body 10. This action, forces the tapered portion 85 of reverse collet 86 further into opening 75 and against tapered wall 94, which closes the slit 37, so that electrode 14 is secured to the reverse collet 86. In addition, the force of push rod 60 securely press-fits bottom portion 87 of reverse collet 86 into an opening in collet 84 to complete the positive contact. The sharpened tip of electrode 14 extends below cup 82 a desired measured length. This design allows the operator to conveniently and quickly remove pusher rod 60 and electrode 14 without disassembling the entire welder. This provides for efficient replacement or removal of electrode 14. The amount of scrap is greatly reduced because minimum tooling adjustment is required before operation may resume. Next, to reposition torch body 10, starting from the position shown in FIG. 2, the operator would pull outward on cap 52, so that the outer edge 93 of indicator arm 54 abuts against an inner wall 95 of indicator block 48. The distance between edge 93 and inner wall 95 is preferably slightly greater than the length necessary for the inner extended portion 92 to clear the edge 97 of torch body 10. The operator may then pull vertically upward on torch body 10, which slides between the insulator plates 110, 111, to the opening 112 formed in the front plate 35. Once notch 19 is aligned with the inner extended portion 92 of indicator arm 54, indicator pin 50 may be slowly released, which allows the metal spring 58 to force the extended inner portion 92 into notch 19. Metal spring 58 retains indicator arm 54 in notch 19. By again pulling the conveniently, front located pin cap 52, the operator may, if desired, retract the spring-loaded indicator pin 50 and quickly readjust the torch body 10 to align with notch 18.

To increase or decrease the distance of electrode 14 from the work, the operator may simply turn adjusting knob 40, which rotates adjusting shaft 42. This turning action is translated through beveled gear set 44 to adjusting screw 46, which moves indicator block 48 in a vertical direction. Indicator arm 54, which fits within opening 59 in the indicator block 48, is also raised or lowered within opening 112 in front plate 35.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. Fixed welding apparatus comprising:

a torch body including an opening formed through its length;

a pusher rod slidably fitting into the torch body opening, the pusher rod including an opening formed therethrough;

a reverse collet including a portion positioned in the pusher rod opening;

a collet attached to the torch body and contacting the reverse collet; and a heat shield attached to the collet.

2. The apparatus of claim 1 further comprising a cup attached to the heat shield.

3. Fixed welding apparatus comprising:

a torch body slidably fitted in a torch housing, the torch body including at least one opening formed in a side portion of the torch body, the at least one opening comprises two notches formed to slidably receive the arm; and a retractable arm member slidably fitted in the side opening.

4. Fixed welding apparatus comprising:

a torch housing;

an adjusting knob extending outward from the torch housing;

an adjusting shaft connected to the adjusting knob;

a beveled gear set in communication with the adjusting shaft;

an adjusting screw in communication with the beveled gear set;

an indicator block having formed therein a threaded opening for receiving the adjusting screw;

an indicator arm connected to the indicator block; and a torch body connected to the indicator arm.

5. The apparatus of claim 4 wherein the indicator block has a second opening formed therein perpendicular to the threaded opening for slidably receiving the indicator arm.

6. The apparatus of claim 4 wherein the torch body has a notch formed therein for receiving an inner portion of the indicator arm.

7. The apparatus of claim 4 further comprising an indicator pin extending from the torch housing and connected to the indicator arm.

8. The apparatus of claim 7 wherein the indicator pin slidably fits in an opening formed in the indicator arm for moving an inner portion of the arm into a notch formed in the torch body.

9. The apparatus of claim 8 further comprising a second notch formed in the torch body and positioned below the first notch.

10. The apparatus of claim 4 further comprising an insulator plate positioned adjacent the torch body.

11. The apparatus of claim 10 further comprising an insulator plate positioned adjacent a bottom end of the torch body.

12. The apparatus of claim 10 wherein the insulator plates comprise bakelight insulation.

13. A method of positioning a fixed welding system comprising:

providing a torch body including a notch formed therein for receiving an arm member;

pulling a compression biased pin member attached to the arm member;

aligning the notch with the arm member; and releasing the pin member thereby moving the arm member into the notch.

14. The method of claim 13 wherein the torch body includes a second notch formed in its side and positioned below the first notch for receiving the arm member.

* * * * *